April 21, 1931.　　　A. W. CAPS　　　1,802,194
PHOTOGRAPHIC APPARATUS
Filed Feb. 29, 1928　　　9 Sheets-Sheet 1
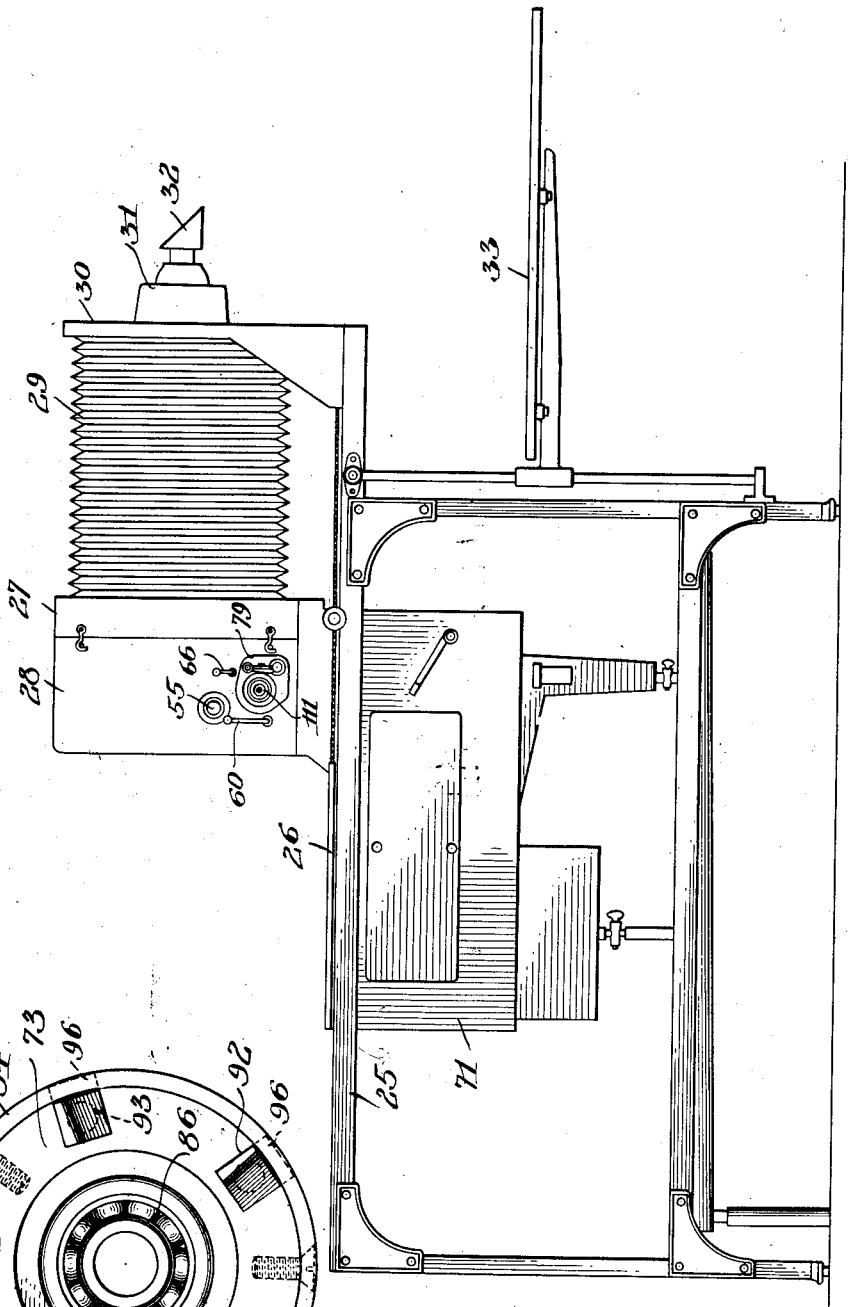
INVENTOR
Arthur W. Caps
BY
his ATTORNEYS April 21, 1931.  A. W. CAPS  1,802,194
PHOTOGRAPHIC APPARATUS
Filed Feb. 29, 1928  9 Sheets-Sheet 2
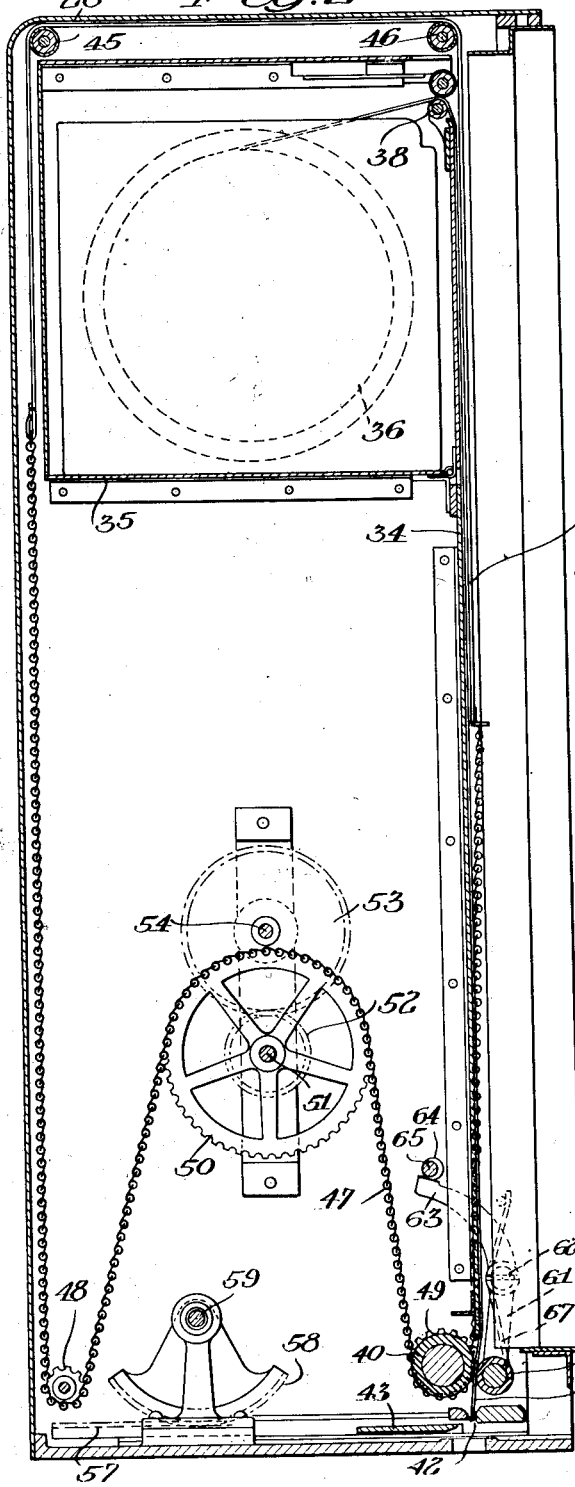
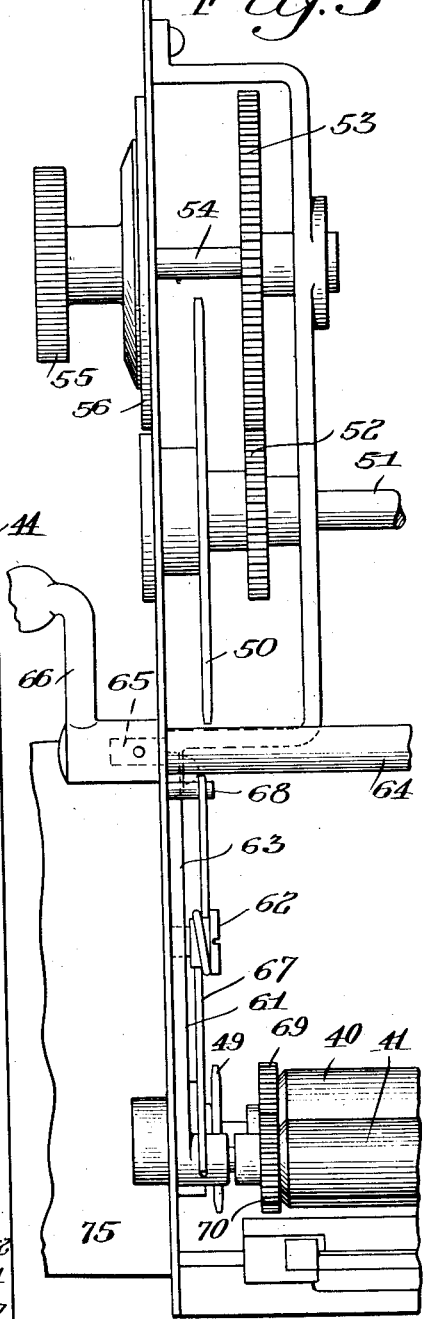
INVENTOR
Arthur W. Caps
BY
Cumpston & Griffith
his ATTORNEYS April 21, 1931. A. W. CAPS 1,802,194
PHOTOGRAPHIC APPARATUS
Filed Feb. 29, 1928 9 Sheets-Sheet 3
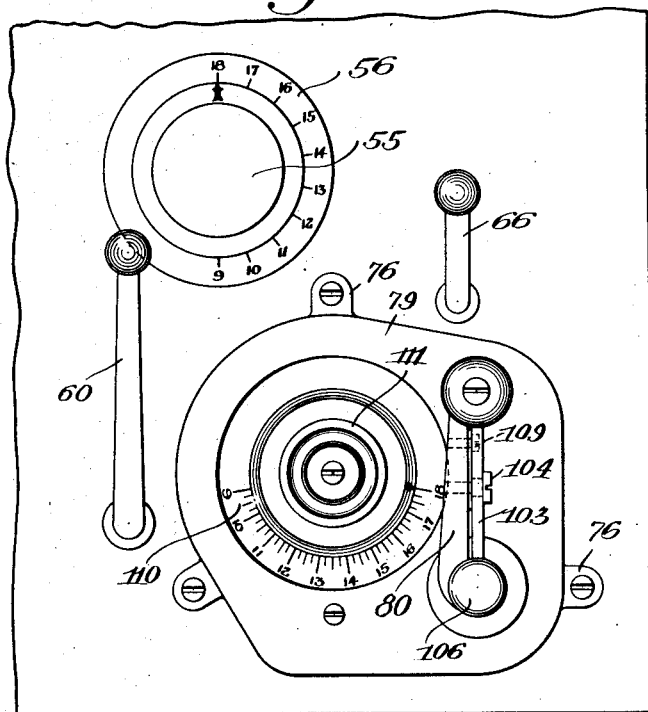
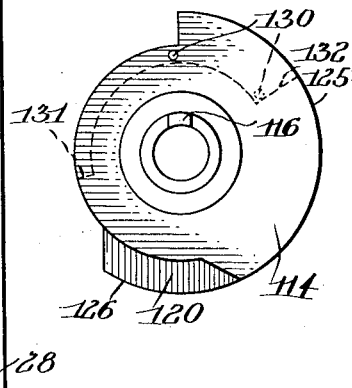
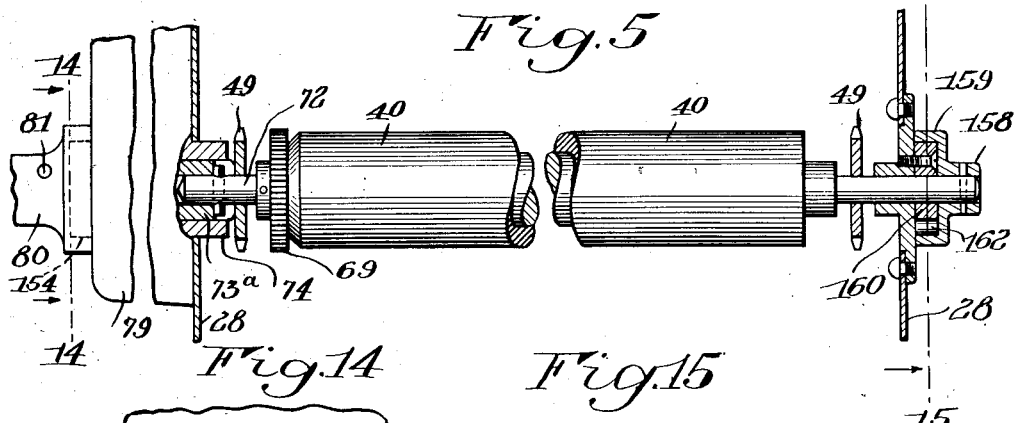
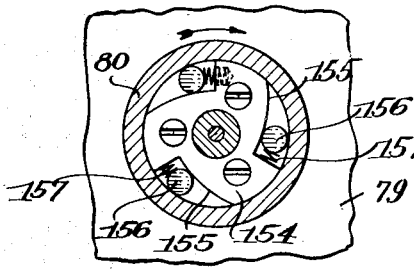
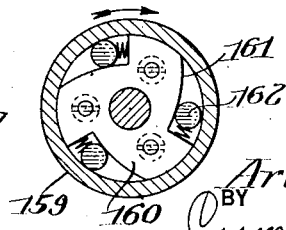
INVENTOR
Arthur W. Caps
BY Cumpston & Griffith
his ATTORNEYS April 21, 1931.  A. W. CAPS  1,802,194
PHOTOGRAPHIC APPARATUS
Filed Feb. 29, 1928    9 Sheets-Sheet 4
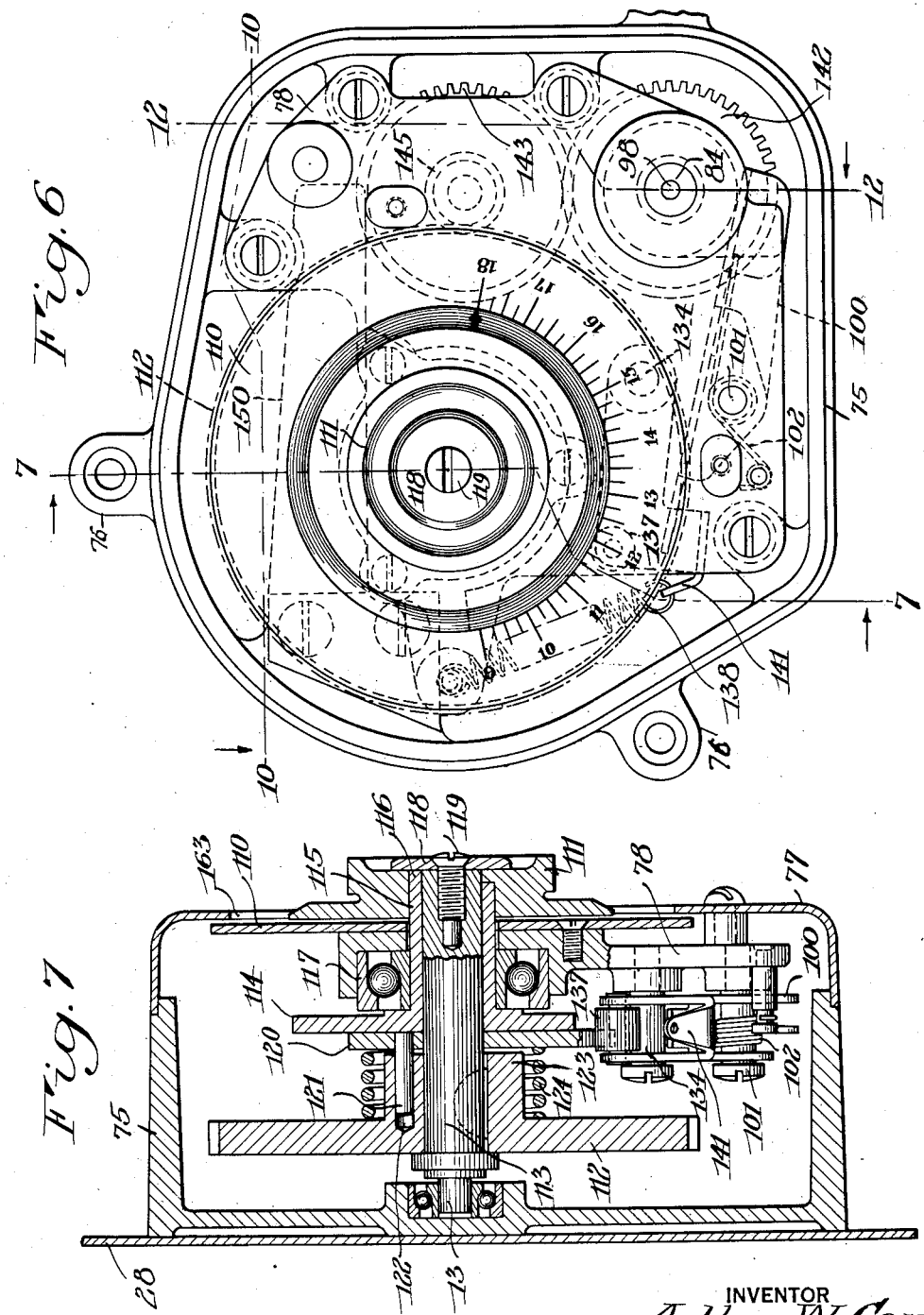
INVENTOR
Arthur W. Caps
BY
his ATTORNEYS

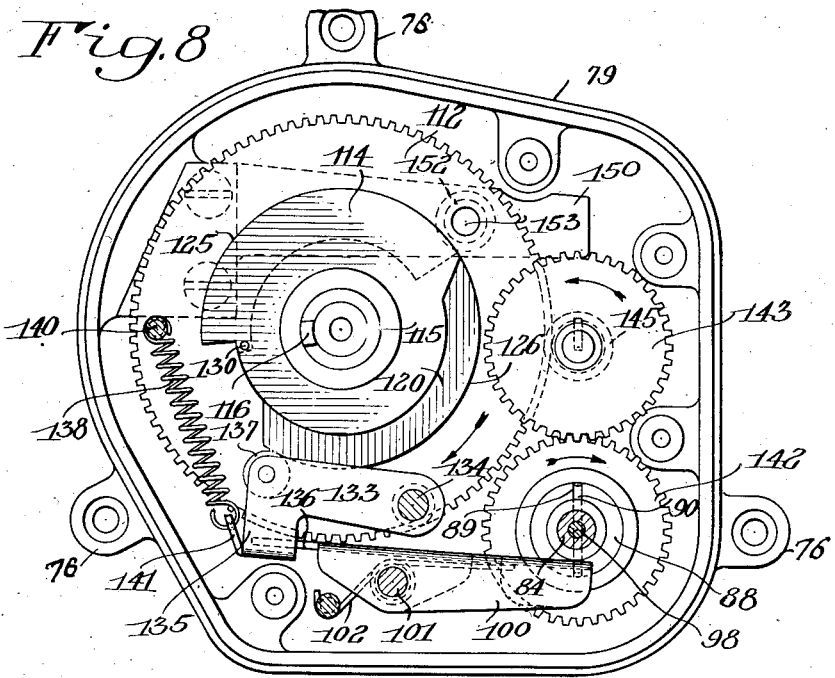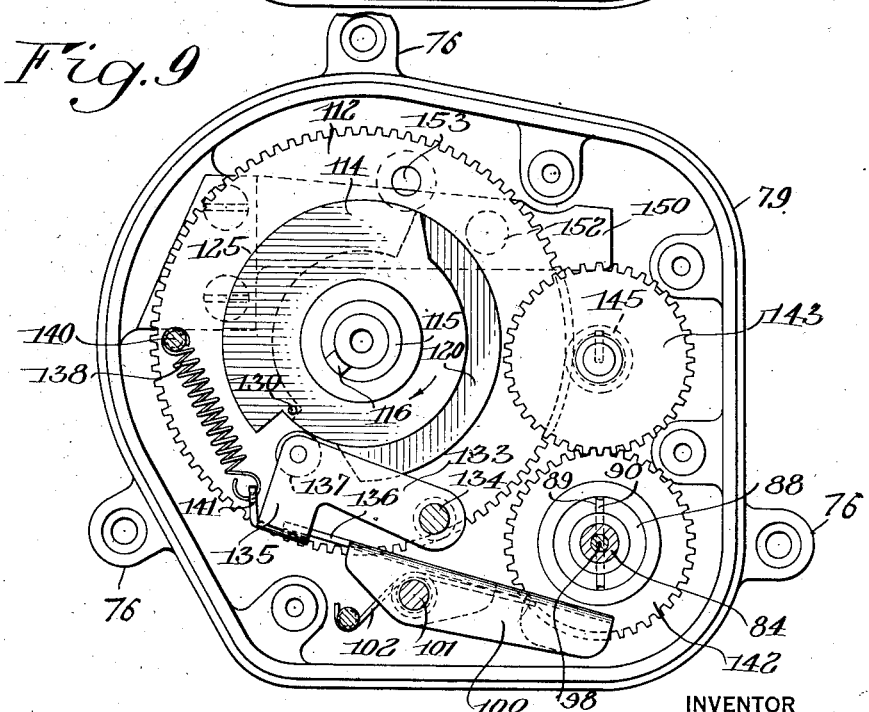

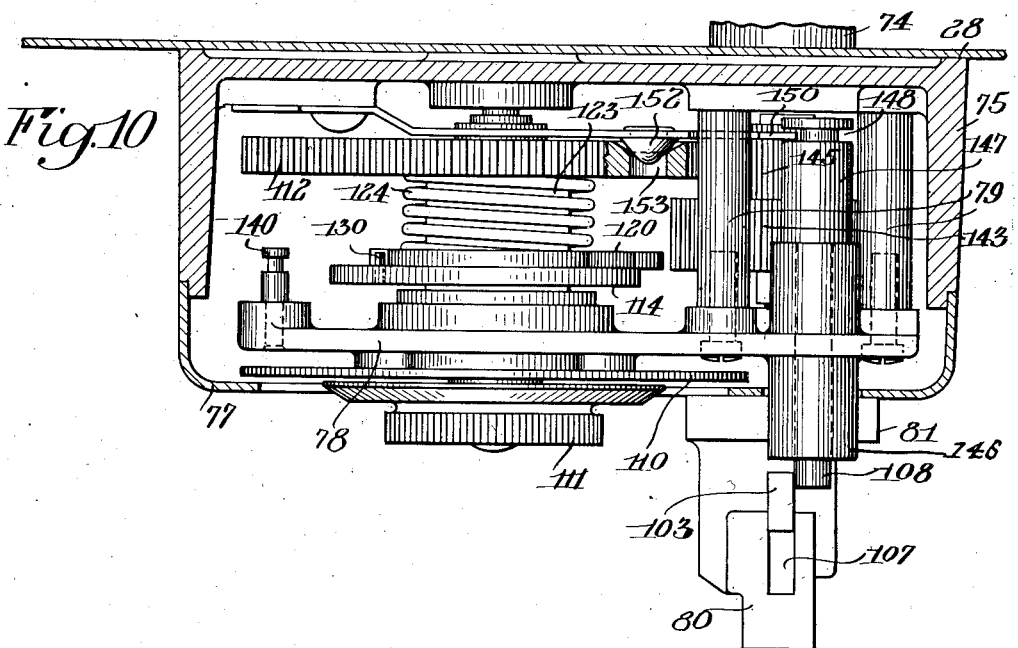
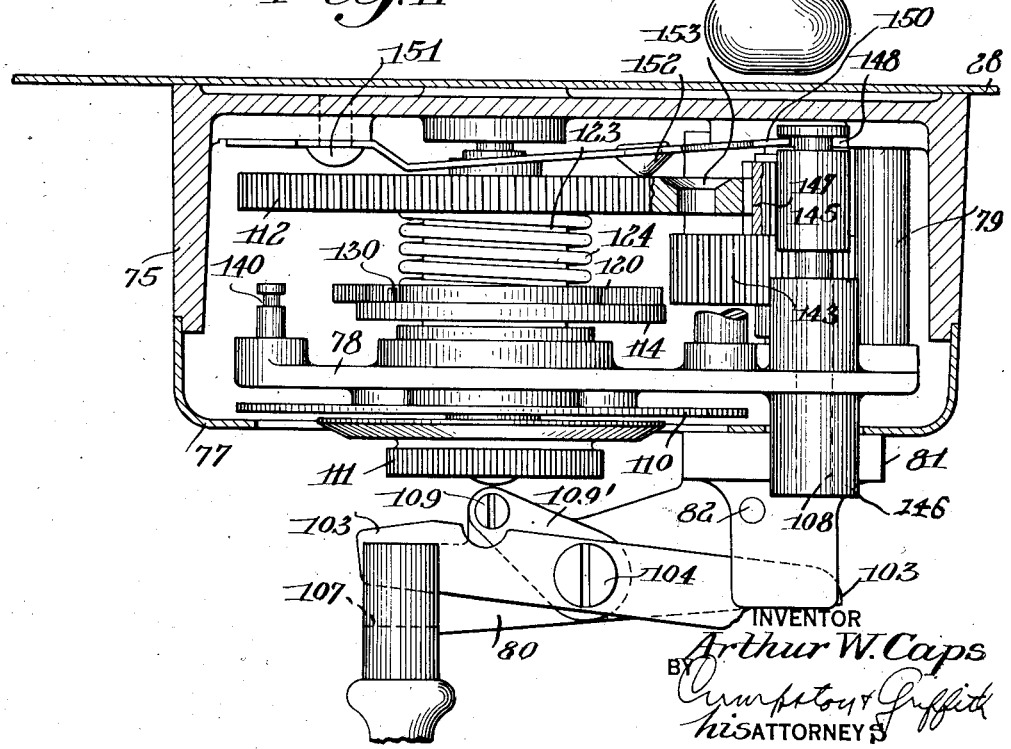

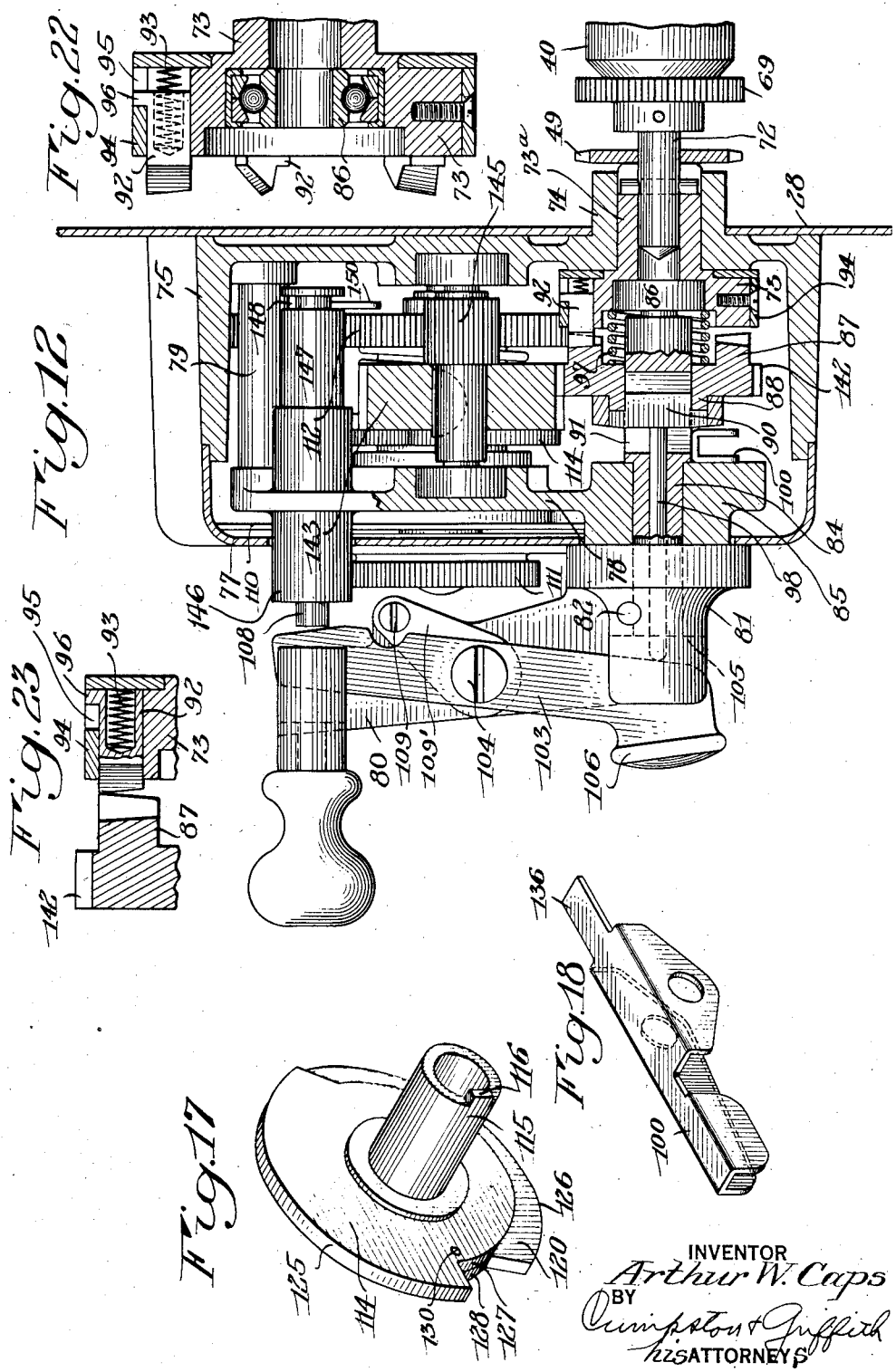

April 21, 1931.  A. W. CAPS  1,802,194
PHOTOGRAPHIC APPARATUS
Filed Feb. 29, 1928    9 Sheets-Sheet 8
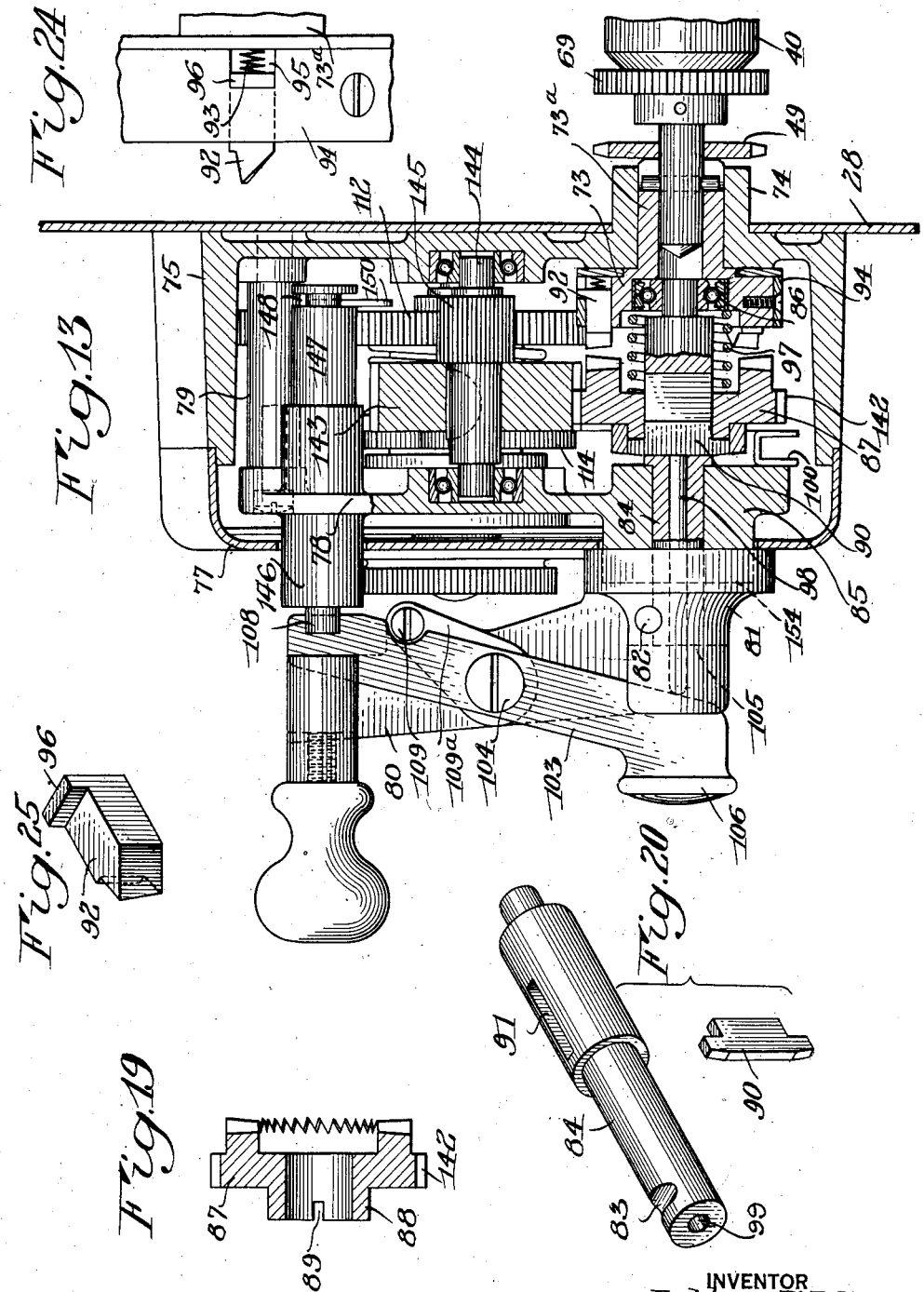

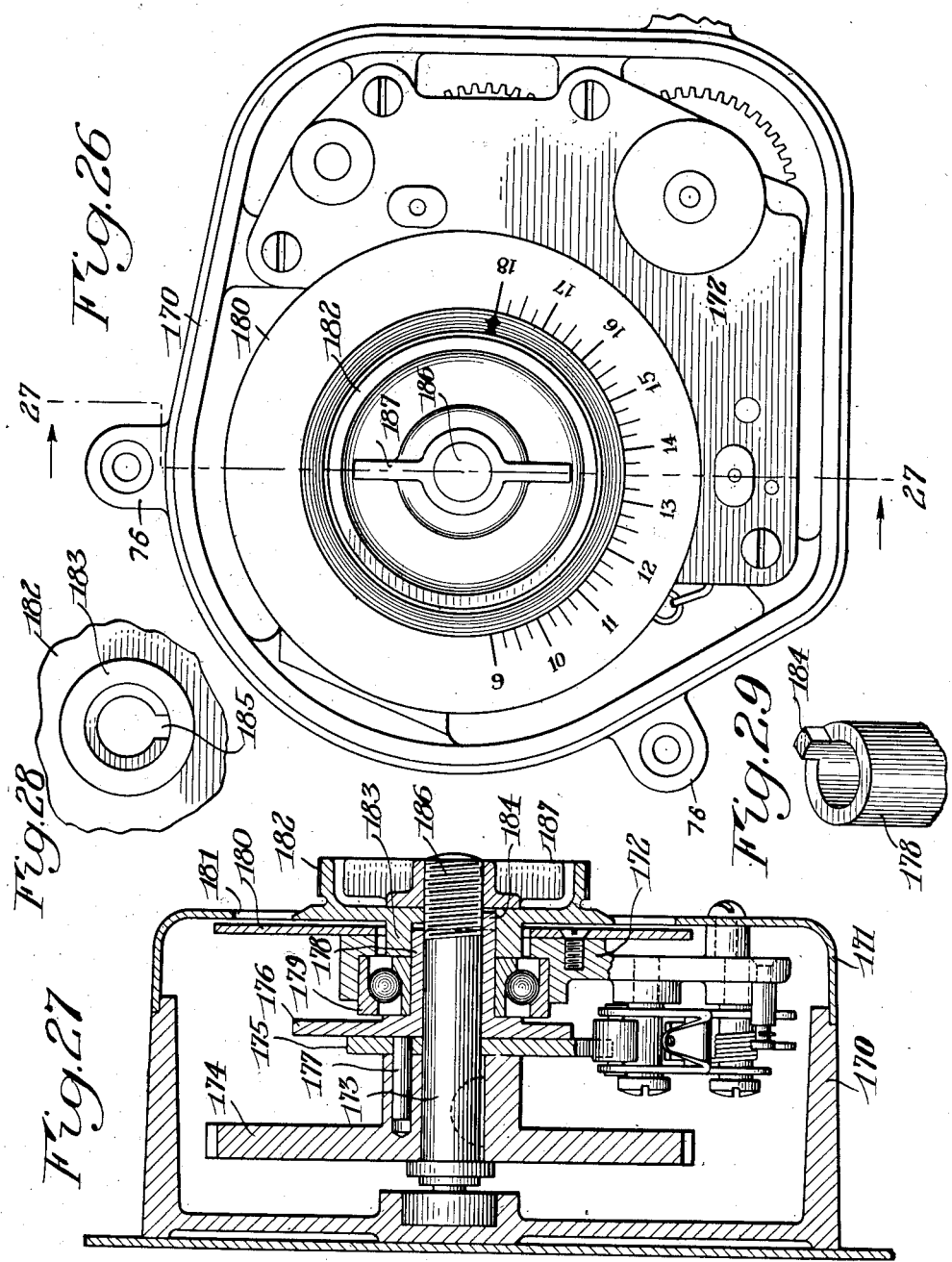

Patented Apr. 21, 1931

1,802,194

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed February 29, 1928. Serial No. 258,016.

The present invention relates to photographic apparatus and more particularly to photographic cameras of the type known as commercial cameras in which prints of objects or documents positioned on the copyholder of the camera, are photographed, cut, developed and fixed in the one apparatus and emerge ready for use after being dried. The film or sensitive paper is usually fed from a roll and severed according to the surface exposed. For small sized photographs only a portion of the maximum length feed is used and the remainder of the strip in the focal plane is masked off for this purpose. The present invention is directed toward providing, in conjunction with a masking means and a severing mechanism, a measuring and feeding mechanism by which the strip can be quickly fed from the roll and severed into any one of an infinite number of predetermined lengths, depending upon the particular length of strip which has been exposed, and which will at all times insure that the paper in the focal plane will be tensioned to the proper degree, and the invention has for its object the provision of a relatively simple, efficient and conveniently operated device of this character.

To these and other ends the invention resides in certain improvements and combinations of parts, all as will be hereinafter more fully described, the novel features being pointed out in the claims at the end of the specification.

In the drawings:

Fig. 1 is a side view of a commercial camera provided with a feeding and measuring device constructed in accordance with and illustrating one embodiment of the invention;

Fig. 2 is a sectional side view of the device illustrating the adjustable masking curtain and the relative arrangement of the sensitized strip and feed rollers therefor;

Fig. 3 is a fragmentary view of a portion of the interior of the casing and parts contained therein illustrated in Fig. 2, certain parts being omitted for the sake of clearness;

Fig. 4 is a framentary side elevation on an enlarged scale of a portion of the casing supporting the dials and operating handles for regulating the various parts of the device;

Fig. 5 is a detail view of the main feed roller for the sensitized strip;

Fig. 6 is a detail view of the variable paper measuring dial and the casing therefor, illustrating in dotted lines certain of the operating parts contained within the casing;

Fig. 7 is a horizontal sectional view taken substantially on line 7—7 of Fig. 6, looking in the direction of the arrows;

Fig. 8 is a view similar to Fig. 6, with the dial and the cover of the casing removed, and illustrating the position of the parts when the feed rolls are being driven;

Fig. 9 is a view similar to Fig. 8, illustrating certain parts as they appear when the drive to the feed rolls has been disconnected;

Fig. 10 is a sectional plan view taken substantially along line 10—10 of Fig. 6, illustrating the operative position of the stop for the crank;

Fig. 11 is a sectional view similar to Fig. 10, illustrating the crank stop retracted;

Fig. 12 is a vertical sectional view taken substantially on line 12—12 of Fig. 6, illustrating the parts as they appear when the feed rolls are being driven;

Fig. 13 is a view similar to Fig. 12, but illustrating the parts as they appear when the drive to the feed rolls has been broken;

Fig. 14 is a sectional view taken on line 14—14 of Fig. 5 showing a clutch device for preventing backward movement of the crank;

Fig. 15 is a sectional view taken on line 15—15 of Fig. 5 showing a similar clutch applied to the shaft of the feed roller;

Fig. 16 is a detail view of the adjustable cam element controlled by the dial knob to determine the length of strip fed from the roll;

Fig. 17 is a detail perspective view of the adjustable cam element in a different adjusted position from that shown in Fig. 16;

Fig. 18 is a detail perspective view of the dog for holding the driving clutches in engagement;

Fig. 19 is a detail sectional view of the slidable clutch element;

opposite
field of exposure or
portion thereof so that a picture
may be properly focused and centered on only
a fractional part, for instance, one half, of
the entire possible field of exposure.

At the front of the casing portion 28 of
the body, which cooperates with the exposure opening at the rear of the fixed portion 27, is a film supporting wall 34 lying
in the focal plane of the camera lens. Disposed at the rear side of the wall 34 is a casing or chamber 35 for containing a roll 36
of sensitized film or paper 37 from which the
film or paper is drawn between guide rollers
38, and down across the face of the support 34 eccentrically
having a pivot portion 65
in the casing walls and projecting
therethrough at the front of the casing. A
crank 66 is secured to the outwardly projecting pivot portion 65 by which the eccentric
shaft 64 may be rotated to engage and depress
the upper portion 63 of the arms 61 to thereby move the roll 41 away from the feed roll
40. The roll 41 is normally yieldingly held
against the roll 40 by means of a spring
67 which is coiled at its central portion about
the pivot element 62 and engages at its lower
end the lower end of arm 61, and at its upper
end engages against a pin 68 fixed in the wall
of the casing. When it is desired to thread
a strip of paper through the device the tension roll 41 is moved away from the roll 40
by the mechanism just described and after the
paper is in proper position the roll 41 is again released and is normally held by spring 67 in yielding engagement with roll 40 while the device is in operation.

The roll 41 is preferably driven with the roll 40 at the same surface speed, and for this purpose the roll 40 has a pinion 69 at the end thereof (see Fig. 3) which meshes with a smaller pinion 70 fixed at the end of roll 41. In practice when roll 41 is moved away from contact with roll 40 the movement is not sufficient to disengage the teeth of the two pinions.

After the exposed strips have been cut off by the blade 43, they pass into a casing 71 suitably supported on and depending from the bed 26 in which they are developed and fixed by mechanism fully disclosed in the co-pending application of J. S. Green, Serial No. 243,181, for photographic developing apparatus, which application has been assigned to the assignee of the present application.

The mechanism for controlling the paper feed roll 40 to feed variable lengths of paper from the paper roll will now be described.

This mechanism comprises generally, in the embodiment shown, a driving mechanism capable of being releasably clutched to the feed roll 40 and a selectively adjustable means whereby the driving mechanism will be held in clutching relation to the feed roll for only a sufficient length of time to cause a desired length of strip to be wound from the roll of sensitized paper or film. To this end the roll 40 is fixed to a shaft 72 which is journalled at one end in the rear wall of the casing 28 and at its forward end is keyed to a clutch member 73 having a sleeve portion 73a which is journalled in a boss 74, projecting inwardly from a casing 75 through the front wall of casing 28. While the control mechanism for the feed roll 40 can be located within the casing 28, if desired, the casing 75 is preferably provided for this purpose in order to facilitate inspection of the parts for oiling or replacement. The casing 75 is suitably secured to the outer wall of casing 28 by means of bolts passing through lugs 76 on the casing. A cover 77 is provided for the front of the casing 75, which cover has suitable openings therein for the accommodation of certain operating parts of the device to be described. The casing 75 includes a front frame plate 78 which is secured in spaced relation to the rear wall of the casing by means of spacing members 79 which are threaded interiorly at each end to receive machine screws passing through suitable apertures in the plate 78 and the rear wall of the casing.

As best shown in Figs. 12 and 13, the driving means for the feed roll 40, in the present embodiment of the invention, comprises a hand crank 80 having a socket portion 81 keyed by means of a pin 82 and groove 83 to a shaft 84, which is journalled at its front end in a boss 85 on the frame plate 78 and is received at its rear end in a bushing 86 supported by means of ball bearings within an opening in the above mentioned clutch element 73, as clearly shown in Fig. 13. A clutch element 87, complementary to clutch element 73, is slidably mounted on but rotatable with the shaft 84. For this purpose the clutch element 87 is provided with a sleeve portion 88 having therein a radial groove 89 adapted for engagement with the ends of a key 90 which is slidable within a longitudinal slot 91 formed in the shaft 84. Thus the clutch element 87 is capable of movement into and out of driving engagement with the clutch element 73 to transmit rotary movement of the crank 80 to the feed roll 40.

The complementary clutch elements 73 and 87 are provided with suitable engaging faces to cause them to rotate in unison when in engagement with each other. For this purpose there is provided on each element a plurality of teeth of the ratchet type adapted for one way transmission or rotation. While the teeth on each clutch element may be made integral therewith, the teeth on at least one of the clutch members are preferably yieldingly mounted, for the purpose of preventing jamming of the clutch members in case the teeth thereof are in exact alignment when it is desired to place the clutch members in operative engagement. In the present instance, the clutch element 73 has provided therein a plurality of axially disposed grooves each of which slidably receives a clutch tooth 92 which is yieldingly held outwardly extended by means of a coil spring 93. The teeth are held within the grooves by means of a ring housing 94, having suitable cut-away portions 95 opposite each groove which extend substantially to the central part of the housing. Within each cut-away portion is disposed a shoulder 96 suitably formed on each tooth 92 so as to limit the outward movement of the tooth.

In order to hold the clutch elements 73 and 87 normally out of contact a coil spring 97 is provided which surrounds the shaft 84 and bears against the inner faces of each clutch element.

Means are provided for moving and holding the clutch element 87 in driving relation with the clutch element 73. Such means, in the present instance, comprises a plunger rod 98, movable within a longitudinal bore 99 provided in the shaft 84 and bearing at its inner end against the back of the key 90 disposed in the slot 91. Movement of the plunger rod toward the right in Fig. 13 causes clutch member 87 to move into driving relation with clutch member 73, as shown in Fig. 12. A pivoted dog 100, see Figs. 8, 9, 12 and 13, has an end thereof normally resting against the periphery of a sleeve surrounding an outward extension of sleeve 88 of clutch member 87 when the clutch members are out of engagement, see Figs. 9 and 13. This dog is pivotally mounted on a pin 101 suitably secured on the frame plate 78, see Fig. 7, and has a spring 102 associated therewith normally tending to move it in a counter-clockwise direction about pin 101, as viewed in Figs. 8 and 9. Thus it will be seen that when the plunger 98 is moved to the right, the end of dog 100 will move against the shaft 84, in between the boss 85 and the rear face of the clutch member 87 (compare Figs. 8 and 9, and Figs. 12 and 13) and thus positively hold the clutch members in driving engagement.

Any suitable means may be employed for moving the plunger 98. This means, in the present embodiment, is preferably in the form of a lever arm 103 pivoted at 104 upon the crank 80. The lower end of the arm 103, as shown in Figs. 12 and 13, is movable within a slot 105 formed in the socket 81 of the crank 80 and engages with the end of the plunger 98. The lower front side of the arm is provided with a suitable enlarged contact surface or button 106 for convenient hand operation thereof.

The upper end of the arm 103, as shown in Figs. 12 and 13, is movable within a slot 107 in the upper end of the crank 80 and extends normally in a position to strike a stop element in the form of a movable plunger 108, the operation of which will be hereinafter described.

In order to limit the swinging movement of the upper end of the arm 103, a suitable stop element 109 is provided which may consist of a machine screw, as shown, threaded into an offset portion 109' of the crank 80. In practice the pivot screw 104, upon which the arm 103 swings, loosely holds the same to permit free swinging movement thereof.

The mechanism for discontinuing the operation of the paper feeding roll after any predetermined length of paper has been delivered will now be described. This mechanism, in the present instance, comprises generally a graduated dial 110, having associated therewith a knob 111 provided with an indicator pointer cooperating with the dial, the knob being connected to means for selectively varying the time at which the end of dog 100 will be removed from its holding relation to the clutch member 87, thus allowing this member to move out of contact with its complementary clutch member 73. To this end, in the present embodiment, there is provided a cycle member or master gear 112, see Fig. 7, which is keyed to a shaft 113 journalled at one end in the rear wall of casing 75, and carrying at its end a cam member 114, having a sleeve 115, to which the knob 111 is rigidly fixed by means of a key 116 on the cam sleeve, which enters within a suitable notch on the knob 111. The sleeve portion of the cam 114 is suitably journalled in an anti-friction bearing 117 supported on the front frame plate 78. The cam 114 is rotatably mounted on the shaft 113 and is held in place against endwise movement therefrom by means of a washer 118 which contacts with the outer face of the knob and the outer end of the cam sleeve 115, and is held in place by a suitable screw 119 threaded into the end of shaft 113.

Cooperating with the cam 114 is a complementary cam member 120 which is arranged for rotation with the gear 112 but is displaceable along the shaft 113 toward and from the gear by means of a pin 121 fixed to the cam 120 but slidable within a bore 122 provided in a hub 123 projecting from the gear 112.

For the purpose of providing a frictional engagement between cam 114 and the master gear 112 there is provided, in the present instance, a coil spring 124 which surrounds the hub 123 of the gear 112 and bears at its ends against the adjacent faces of cam 120 and gear 112. Thus the cam elements 114 and 120 are held in snug frictional contact which normally causes movement of both cam members in unison with the gear 112 when the latter is rotated. It is apparent, however, that the cam 114 may be manually displaced relatively to cam 120 by manual rotation of the knob 111.

Referring now to Figs. 8, 9, 16 and 17 it will be seen that the cam members 114 and 120 have respectively thereon faces 125 and 126 having the same radius, and faces 127 and 128, the radii of which are substantially equal but shorter than the radii of faces 125 and 126. It will thus be apparent that the two cam members between them form a single adjustable cam element having concentric peripheral faces of varying distances from the shaft, which can be lengthened or shortened circumferentially by appropriate rotation of the knob 111.

Means are preferably provided for limiting the displacement of the cam members relatively to each other. For this purpose a stop pin 130 projects from the rear face of cam 114 for abutment against suitable shoulders 131 and 132 formed on the cam 120.

Means are provided in connection with the adjustable cam element for effecting the withdrawal of the dog 100 from holding engagement with the clutch member 87. For this purpose there is provided a dog 133 suitably pivoted at 134 on the frame plate 78 and conveniently formed with two arm portions joined by a depending U-shaped yoke 135 at its free end, as best shown in Figs. 7, 8 and 9. Extending loosely within this U-shaped yoke is a tail piece 136 formed on the end of the clutch locking dog 100 thus providing a one-way lost motion connection between the dogs 100 and 133. The dog 133 is provided with a contact member such as a roller 137 which cooperates with the face of the adjustable cam element. Suitable means, such as a coil spring 138, is provided for constantly urging the roller 137 of the dog 133 against the periphery of the adjustable cam element. One end of spring 138 is conveniently secured to a projection 140 located on the frame plate 78 while its other end is secured in an eye in an extension 141, provided at the end of the dog 133.

It will be seen that when the cam element is in such position that its low part engages the roller 137, the dog 100, by reason of its connection with dog 133, will be held out of locking relation with the clutch member 87, and when the high part of the cam element engages roller 137, the dog 100 will be free to enter into locking relation to the clutch member 87 when the latter is moved over by the plunger 98, and will remain in such locking position until the high face of the cam moves out of contact with the roller 137.

Mechanism is provided for driving the master gear from the crank 80. For this purpose, in the present embodiment, the clutch member 87 is provided with a gear portion 142, which meshes with a wide pinion 143, keyed to a shaft 144 which is journalled in its ends in the front plate 78 and the rear wall of the casing 75. The shaft 144 also carries a pinion 145 which meshes with the above mentioned master gear 112. Thus by rotation of the hand crank 80 motion is transmitted from the crank shaft 84 to the clutch member 87 and from the latter to the master gear through the medium of the gear elements 143 and 145.

In the preferred form of the invention the parts are so correlated that the hand crank will be rotated an integral number of turns to one rotation of the master gear 112. The particular ratio is not material, but in the present instance, the ratio of rotation of such parts is seven turns of the crank to one rotation of the master gear. Thus, by this provision, the parts are always returned to the same relative position after the feeding of a measured strip of paper, regardless of what length is fed.

In order to insure the stoppage of the parts at the same point in their cycle of movement, the above mentioned plunger stop element 108 is arranged in such a manner as to be projected into the path of the end of arm 103 on crank 80 just prior to the completion of each cycle of movement, which, in the present instance, is equivalent to one rotation of the master gear 112. While it is within the scope of the present invention to locate this stop element at any convenient place, as for example, adjacent the shaft 84, it is preferably disposed at a point near the end of the crank 80, for the reason that in this position its operation is more certain and it need not have the strength which would be required if it were located near the turning axis of the crank, since in the outer position it is not subjected to any substantial leverage force.

The plunger 108 is slidably mounted within a bore formed in a boss 146, located on the frame plate 78, and has at its inner end an enlarged portion 147 provided with a peripheral groove 148. A plunger operating arm 150 formed of a strip of resilient material is suitably secured at one end, as at 151, to the rear wall of casing 75 and extends across the face of the master gear 112 and has its end engaged within the peripheral groove 148 of the plunger 108. The arm 150 has disposed thereon at an intermediate point a cam element 152 in the form of a conical projection which is adapted to cooperate with a suitably formed opening 153 in the master gear 112. Thus when the cam projection 152 enters the opening 153, the end of the arm 150 will force the plunger outwardly due to its resiliency but when the master gear has rotated a small distance the cam projection is displaced from the opening and thereafter bears against the rear face of the master gear 112, as shown in Fig. 11, until the latter again returns to substantially its normal position at the end of its cycle of movement when the cam projection again moves into the opening 153, as shown in Fig. 10.

Means are preferably provided for preventing reverse rotation of the crank 80 in any angular position it may assume. For this purpose there is provided a one-way clutch construction, as illustrated in Fig. 14, comprising a cam element 154 fixed to the end of the boss 85 and having cam surfaces 155, forming with the crank socket 81 a plurality of tapered pockets in each of which is located a roller 156 held toward the small end of the pocket by means of a spring 157. With this construction the crank may rotate freely in the direction of the arrow in Fig. 14, but if an attempt is made to rotate it in the reverse direction the rollers roll toward the narrow ends of the pockets and bind them between the cam surfaces 155 and the wall of the crank socket and thus effectively prevent reverse or retrograde movement of the handle.

It is also desirable to prevent retrograde movement of the feed roll 40 so as to insure that the sensitized paper will be held taut after the feeding operation has ceased. Mechanism suitable for this purpose is illustrated in Fig. 15 and comprises a one-way clutch, similar to that shown in Fig. 14. In this construction the end of shaft 72 has keyed thereto a cap 158, having a collar portion 159 which surrounds a cam member 160 having cam surfaces 161 between which and the collar 159 are disposed spring pressed rollers 162. Thus, in the manner previously described, the roll 40 may turn freely in the direction indicated by the arrow in Fig. 15 but is prevented from turning in the opposite direction.

It is due principally to the fact that the feed roll is prevented from retrograde movement that it is desirable to provide the yielding clutch teeth above described. It will be readily seen, on reference to Figs. 12, 13 and 23, that when the clutch element 87 is moved toward the clutch element 73 it sometimes happens that the edges of the clutch teeth exactly engage and will not intermesh. Thus, if it were not for the fact that one set of clutch teeth is yieldingly mounted the clutch elements could not be placed in operative engagement for the reason that the feed roll is held from movement in one direction and the operating crank is held from movement in either direction until the clutch element 87 has been moved over far enough to be locked by the dog 100, thus allowing the end of arm 103 to clear the stop 108.

The graduated dial 110 is conveniently located on the front face of the frame plate 78, and a circular opening 163 is provided in the cover 77 for permitting observation of the dial therethrough.

The dial 110 is graduated in any convenient unit, the figures shown thereon in the present case indicating inches. Thus by turning the pointer on the knob to 15, for example, the operator knows that a strip 15 inches long will be fed from the paper roll.

The dial 56 for the masking curtain is preferably graduated in like units and, in practice, each knob will be turned to indicate the same number on the dial. Thus, if the print is to be 15 inches long the curtain will be moved so as to expose 15 inches of paper.

Referring again to Fig. 4, it will be seen that the controlling devices for the various operating parts of the device used in winding down the strip, masking it, and severing it from the paper roll are conveniently and compactly arranged so that the operator will be enabled to manipulate the controlling devices in a minimum amount of time and effort.

In the operation of the device, the paper is first fed into the machine with the tension roll 41 held out of contact with the feed roll 40. When the paper is in the proper position the tension roll is released by means of the handle 66 so that the spring 67 holds the roll tightly against the paper. The roll 40 at this time is prevented from retrograde movement by its one-way clutch mechanism 159. If the operator desires to take a picture of maximum length both knobs are left pointing to 18 as shown in Fig. 4. The exposure is made with the crank 80 in a vertical position, as shown in Fig. 4, with the plunger stop member 108 projecting forwardly to prevent forward movement of the handle, rearward movement of the handle as previously explained, being prevented by its one-way clutch mechanism, shown in Fig. 14. When the handle is in vertical position, with the plunger 108 extended, the master gear 112 will be in the position shown in Figs. 8 and 10, with cam projection 152 in the opening 153 of the gear, and the roller 137 on dog 133 will be in contact with the high surface of the adjustable cam element, as shown in Fig. 8. With the cam members of the adjustable cam element positioned as shown in Figs. 8 and 9 the maximum length of strip will be fed by the feed rolls 40 and 41. With the cam members moved to the position, shown in Fig. 16, approximately two-thirds of the maximum length will be fed through the apparatus, and with the cams in a position in which the stop pin 130 engages shoulder 132 as indicated by dotted lines in Fig. 16 the minimum desirable length, which is approximately one-half of the maximum length, will be fed through the apparatus.

After the exposure has been made and the operator desires to wind down and cut off the strip which was exposed, he presses on the button 106 of the arm 103 and causes a rearward movement of the plunger 98 which pushes the clutch member 87 into operative engagement with clutch member 73. As soon as the clutch member 87 has cleared the end of the dog 100, the latter immediately snaps into position between the end of the clutch sleeve and the boss 85 and thus locks the clutch members in driving relation. See Figs. 8, 12 and 13. The device is now in readiness for turning the crank, the stop plunger 108 no longer interferes with the movement of the crank by reason of the fact that the arm 103 has been swung to such a position that its upper end will not strike the plunger as it moves past the same. See Fig. 12.

The operator now turns the crank 80. Such movement rotates the feed rolls 40 and 41 and the master gear 112 which latter carries with it the adjustable cam element. The paper will be fed by the feed rolls until the high part of the cam element clears the roller 137 on the dog 133 and allows the latter to move under the influence of spring 138, so that the roller bears against the low part of the cam, see Fig. 9. This movement causes rocking of the dog 100, due to its connection with dog 133, and moves the end thereof out from between the clutch element 87 and the boss 85. When this occurs, the clutch element 87 is forced by the spring 97, out of contact with clutch element 73 and the rolls 40 and 41 immediately cease feeding paper. Movement of clutch element 87 forces the plunger 98 to the left (Fig. 13) and swings the arm 103 on crank 80 about its pivot so that its upper end will extend in a position to strike the stop plunger 108 when the latter is projected. In the case where the maximum length of strip is fed, the clutch members will not be disconnected until nearly the completion of the cycle of operation, that is, the crank 80 will have made about six and one-half revolutions and the master gear will have made about the fraction of 6½/7, or 13/14 of a revolution. After the clutches have been disconnected but before the crank reaches a vertical position at the end of the operative cycle the cam projection 152 drops into the opening 153 on the master gear and the arm 150 moves from its position in Fig. 10 to the position shown in Fig. 11 thus projecting the plunger stop 108 in the path of the end of arm 103 as shown in Fig. 13. The crank 80 is thus positively stopped from further forward movement and the parts are in readiness for the next paper feeding operation.

The operator next moves the crank 60 to cause the blade to cut off the exposed portion at the end of the strip. This portion or print then passes down into the compartment 71 where it is subjected to developing and fixing operations.

It will be noted that the dial indicator knob rotates with the master gear 112 but, due to the fact that a full cycle of operation is completed each time any given length of paper is fed from the paper roll 36, the indicator knob will always return to proper indicating position at the completion of the cycle, which involves one complete turn of the master gear.

If less than the maximum length of strip is to be exposed and cut off, the indicator knob 55 is set at the desired point, for example 12 inches, and the knob 111 is set at a corresponding point. This movement will cause the cam member 114 to rotate relatively to cam member 120 from the position indicated in Figs. 8 and 9 to substantially the position shown in Fig. 16, thus shortening the effective length of the high part of the adjustable cam element comprising cam faces 125 and 126. This causes separation of the clutch members at an earlier point in the rotation of the master gear, or in other words at an earlier point in the cycle of operation, with the consequence that a shorter strip of paper is fed from the paper roll.

It has been found in practice that the range of the measuring device from approximately one-half sheet to a full sheet is sufficient for all purposes. If prints are desired which are less than a half sheet, it is customary to run two or more such small prints through the apparatus together and after development and drying they can be severed. This method thus permits the use of more than a half sheet at each exposure and thus obviously speeds up the production since a single exposure time suffices for two or more prints.

In the modified form of the invention, illustrated in Figs. 26 to 29, the dial knob is associated in such a manner with the cams which it controls as to permit the knob to turn freely to adjust one cam member with respect to the other, or to lock the dial knob and cams in fixed relation to each other.

In this form of the invention, a base frame 170, similar to frame 75, is secured to the casing of the camera. Upon the base frame 170 is secured a cover plate 171 which supports the bearing frame 172 in which is journaled the cam and master gear assembly, comprising a shaft 173 which is journalled at its rear end in the base frame 170 and which carries a master gear 174, a cam 175 and another cam 176. The cam 175 is mounted for endwise sliding movement on the shaft 173, but is keyed at 177 to the master gear in a similar manner, as shown in the first form of the invention. The mechanism described thus far is substantially identical to the corresponding parts of the first form of the invention.

In this form of the invention, however, the coil spring provided between the master gear and its adjacent cam has been dispensed with. The cam 176 is provided with a sleeve portion 178, which projects forwardly substantially to the front of the casing. Surrounding this sleeve is an anti-friction bearing member 179 which is mounted within the bearing frame 172, holding the sleeve in place and consequently supporting the front end of the shaft 173.

A suitable dial member 180 is secured on the bearing frame 172 adjacent a circular opening 181 formed in the cover 171, similar to the construction of the first form of the invention.

A dial knob 182 is provided with a sleeve portion 183, which surrounds the front end of the cam sleeve 178. For the purpose of preventing relative movement between the cam sleeve and the dial knob, the cam sleeve is provided with a lug 184 which engages in a slot 185 formed on the interior of the sleeve 183.

The front end of the shaft 173 is provided with a threaded portion 186 upon which is threaded a wing nut 187 adapted to bear against the front face of the dial knob. By reference to Fig. 27, it is apparent that when the wing nut is tightened against the face of the dial knob, the cam 176 is forced against the cam 175 thus holding them in tight engagement. When it is desired to shift the position of the cam 176 relatively to the cam 175, the operator loosens the wing nut 187 by holding the dial knob with one hand and turning the wing nut to the left, as shown in Fig. 26, with the other hand, to move the wing nut out of contact with the face of the dial knob. This releases the pressure between the cam members 175 and 176 and permits the operator to adjust the cam 176 with ease from the dial knob. The construction of this modification is sometimes preferable to the use of the tension spring disclosed in the first form of the invention, for the reason that, when the tension of the spring is sufficient to properly hold the cam members together, the dial knob is somewhat difficult to turn. In this form, however, the dial knob turns very freely when the wing nut 187 is loosened so that it can be placed with ease in proper adjusted position, after which the operator is enabled to rigidly lock the dial knob and its cam together merely by a slight turn of the wing nut.

From the foregoing it is apparent that there is provided a highly efficient apparatus for making photographic prints of any desired size and for winding down and cutting off the desired size of print in an accurate and effective manner.

I claim as my invention:

1. In a photographic apparatus, the combination with a camera and a feeding member for drawing a supply of sensitized material through the focal plane, of driving mechanism therefor having a predetermined cycle of operation, and selective mechanism operative to connect said feeding member to said driving mechanism during predetermined variable portions of said cycle.

2. In a photographic apparatus, the combination with a camera and a feeding member for drawing a supply of sensitized material through the focal plane, of driving mechanism therefor, mechanism for selectively connecting said driving mechanism with said feeding member, means associated with said driving mechanism for disconnecting the latter from the feeding member at varying predetermined points in the operation of said driving mechanism, to cause variable length strips of sensitized material to be fed, and means for masking off portions of the exposure opening in accordance with the length of strip fed by the feeding member.

3. In a photographic apparatus, the combination with a camera and a feeding member for drawing a supply of sensitized material through the focal plane, of driving mechanism therefor having a predetermined cycle of operation, separable driving connections between said driving mechanism and said feeding member, and selective mechanism for controlling said connections whereby said feeding member will be driven by said driving mechanism for predetermined variable portions of the cycle.

4. In a photographic apparatus, the combination with a camera and a feeding member for drawing a supply of sensitized material through the focal plane, of driving mechanism therefor having a predetermined cycle of operation, selectively engageable clutch elements between said driving mechanism and feeding member, means for holding said clutch elements in driving engagement, and means operated in synchronism with said driving mechanism for effecting the disengagement of said clutch elements at a predetermined point in the cycle of said driving mechanism.

5. In a photographic apparatus, the combination with a camera and a feeding member for drawing a supply of sensitized material through the focal plane, of driving mechanism therefor having a predetermined cycle of operation selectively engageable clutch elements between said driving mechanism and feeding member, means for holding said clutch elements in driving engagement, means operated in synchronism with said driving mechanism for effecting the disengagement of said clutch elements at a predetermined point in the cycle of said driving mechanism, and mechanism for varying the point in the cycle at which the driving mechanism will be disconnected.

6. In a photographic apparatus, the combination with a camera and a feeding member for drawing a supply of sensitized material through the focal plane, of driving mechanism therefor having a predetermined cycle of operation, separable driving connections between said driving mechanism and feeding member, a cam member operated in synchronism with said driving mechanism, mechanism controlled by said cam member at a predetermined point in the cycle of said driving mechanism for effecting the separation of said separable driving connections, and mechanism for altering the phase of the cam member relatively to the cycle of said driving mechanism whereby the time at which the separation of the driving connections is effected will be advanced or retarded.

7. In a photographic apparatus, the combination with a camera and a feeding member for drawing a supply of sensitized material through the focal plane, of driving mechanism therefor comprising a manually operable crank shaft, separate driving connections between said shaft and said feeding member, a cycle member operated by rotation of said shaft, mechanism for moving and for holding said separable driving connections in driving relation, means associated with said cycle member for effecting the separation of said driving connections at a predetermined point in the rotation of said cycle member, and means operable by said cycle member for stopping the rotation of said crank shaft after a fixed number of rotations of the latter.

8. In a photographic apparatus, the combination with a camera and a feeding member for drawing a supply of sensitized material through the focal plane, of driving mechanism therefor comprising a shaft, separable driving connections between said shaft and said feeding member, a cycle member operated by rotation of said shaft, mechanism for moving and for holding said separable driving connections in driving relation, mechanism associated with said cycle member for effecting the separation of said driving connections at a predetermined point in the operation of said cycle member, means for changing the phase of the last mentioned mechanism relative to the movement of the cycle member, and mechanism operable by said cycle member for stopping the rotation of said shaft after a fixed number of rotations of the latter.

9. In a photographic apparatus, the combination with a camera and a feeding member for drawing a supply of sensitized material through the focal plane, of driving mechanism therefor, devices for selectively connecting and disconnecting said driving mechanism and said feeding member, and mechanism for preventing retrograde movement of said feeding member after disconnection of the driving mechanism therefrom.

10. In a photographic apparatus, the combination with a camera and a feeding member for drawing a supply of sensitized material through the focal plane, of driving mechanism therefor having a cycle of operation, mechanism for selectively connecting said driving mechanism with said feeding member substantially at a fixed point in said cycle, and means associated with said driving mechanism for disconnecting the latter from the feeding member at varying predetermined points in the cycle of operation of said driving mechanism.

11. In a photographic apparatus, the combination with a camera and a feeding member for drawing a supply of sensitized material through the focal plane, of driving mechanism therefor having a predetermined cycle of operation, selectively engageable clutch elements between said driving mechanism and feeding member, a device for holding said clutch elements in driving engagement, mechanism operated in synchronism with said driving mechanism for effecting the disengagement of said clutch elements at a predetermined point in the cycle of said driving mechanism, mechanism for varying the point in the cycle at which the driving mechanism will be disconnected, and mechanism associated with said last mentioned mechanism for indicating the length of sensitized material fed by the feeding member.

12. In a photographic apparatus, the combination with a camera and a feeding member for drawing a supply of sensitized material through the focal plane, of driving mechanism therefor having a predetermined cycle of operation, separable driving connections between said driving mechanism and feeding member, a cam member operated in synchronism with said driving mechanism, mechanism controlled by said cam member at a predetermined point in the cycle of said driving mechanism for effecting the separation of said separable driving connection, means for altering the phase of the cam member relatively to the cycle of said driving mechanism whereby the time at which the separation of the driving connections is effected will be advanced or retarded, and indicating means associated with said last mentioned means for indicating the length of sensitized material which will be fed by the feeding member for any adjustment of the cam member.

13. In a photographic apparatus, the combination with a camera and a feeding member for drawing a supply of sensitized material through the focal plane, of driving mechanism therefor, selectively operable driving connections between said feeding member and driving mechanism, yielding means normally tending to render said driving connections inoperative, mechanism for rendering said driving connections operative so that the feeding member may be driven, and means operating in synchronism with said driving mechanism for rendering said last mentioned mechanism ineffective so that the operation of the feeding member is immediately discontinued.

14. In a photographic apparatus, the combination with a camera and a feeding member for drawing a supply of sensitized material through the focal plane, of driving mechanism therefor, selectively operable driving connections between said feeding member and driving mechanism, mechanism for rendering said driving connections operative, mechanism for rendering the driving connections inoperative at various selected points in the operation of the driving means, and indicating means associated with said last mentioned mechanism for showing the length of sensitized material fed by the feeding member during its period of operation.

15. In a photographic apparatus, the combination with a camera and a feeding member for drawing a supply of sensitized material through the focal plane, of driving mechanism therefor having a predetermined cycle of operation, selectively operable driving connections between said feeding member and driving mechanism, a locking device for holding said driving member at the end of its cycle, mechanism for simultaneously rendering said driving connections operative and unlocking said driving mechanism at the beginning of its operative cycle, and mechanism for rendering the driving connections inoperative at various predetermined points in the operative cycle of said driving means.

16. In a photographic apparatus, the combination with a camera and a feeding member for drawing a supply of sensitized material through the focal plane, of driving mechanism therefor, clutch elements for selectively connecting the feeding member and driving mechanism, said driving mechanism feeding member, mechanism for
said driving mechanism from move-
ither direction until said clutches are
ment, and mechanism for prevent-
grade movement of said feeding
the clutch teeth on one of said clutch
being yieldable to permit movement